US010821371B2

(12) United States Patent
Greve (10) Patent No.: US 10,821,371 B2
(45) Date of Patent: Nov. 3, 2020

(54) RADIO CONTROLLED VEHICLE INFRARED COMBAT SYSTEM

(71) Applicant: Video Aerial Systems, LLC, Madison Heights, VA (US)

(72) Inventor: Charles A. Greve, Amherst, VA (US)

(73) Assignee: VIDEO AERIAL SYSTEMS, LLC, Madison Heights, VA (US)

(*) Notice: Subject to any disclaimer, the term of this patent is extended or adjusted under 35 U.S.C. 154(b) by 0 days.

(21) Appl. No.: 15/950,100

(22) Filed: Apr. 10, 2018

(65) Prior Publication Data

US 2019/0351343 A1 Nov. 21, 2019

(51) Int. Cl.
*A63H 27/00* (2006.01)
*A63H 30/04* (2006.01)
*G05D 1/12* (2006.01)

(52) U.S. Cl.
CPC .......... *A63H 27/004* (2013.01); *A63H 30/04* (2013.01); *G05D 1/12* (2013.01); *A63F 2300/307* (2013.01)

(58) Field of Classification Search
USPC .......................................................... 463/2
See application file for complete search history.

(56) References Cited

U.S. PATENT DOCUMENTS 5,127,658 A * 7/1992 Openiano ............. A63F 9/0291
446/130
2018/0081356 A1* 3/2018 Boden ..................... A63F 13/65

* cited by examiner

*Primary Examiner* — Pierre E Elisca
(74) *Attorney, Agent, or Firm* — Rupak Nag (57) ABSTRACT

Provided are examples of a radio controlled vehicle infrared combat system and methods of gameplay for radio controlled vehicles. In one aspect, the system is comprised of a 38 KHz IR transmitter, 38 KHz IR filtered receiver, an audio/visual display, and a processing unit. The system accepts signals from both the IR receiver and the vehicles control receiver and manipulates the control output to the vehicle to simulate damage. When firing, the IR transmitter is enabled and disabled. The processing unit disables the IR receiver when the IR transmitter is engaged to avoid hitting its own receiver. The processing unit has user-adjustable settings to allow for use in various types of RC vehicles including land vehicles, RC aircraft, and drones.

19 Claims, 6 Drawing Sheets

RADIO CONTROLLED VEHICLE INFRARED COMBAT SYSTEM

TECHNICAL FIELD

The present invention relates to gaming systems and software. More specifically, it relates to combat style game using infrared for transmitting data between radio-controlled vehicles or drones for combat style gameplay.

BACKGROUND

Infrared is used to transmit data over relatively short distances. It is most commonly used in remote control systems for television, DVD players, CD players and other media devices. They incorporate a transmitter which encodes a signal and sends it via infrared light to a receiver which accepts that light and decodes the signal and processes it. Many of these systems involve a daylight filter to minimize the effect of ambient light or more specifically, Sunlight.

Several other radio controlled combat systems have been made and documented. With reference to Korean filing KR20090088045A (Radio controlled airplane system with combat function) herein referenced as prior art 1 a system is described with an "electronic beam transmitter" with smoke or light outputs as well as a video screen overlay. The current disclosure has some similar features such as a light output. However the current disclosure differs greatly from prior art 1 by using specifically pulsed infra-red light and associated detectors. Prior art 1 does not include systems to pulse the vehicle motor nor does it allow for multiple modes which can alter controls of the vehicle.

Other prior art may be found in U.S. Pat. No. 7,806,371B2 "Remote controlled model aircraft with laser tag shooting action" referenced herein as prior art 2. Prior art 2 shares a similarity to the present disclosure specifically in the emitting of infra-red light to a detector. However, prior art 2 does not include provisions for pulsing of the vehicle motor, modification of the controls, and has no light displays. It also does not include provisions for which the vehicles to not interfere with their own systems such as the present disclosure which shuts down the IR receiver during a gun fire burst.

Additional similarities may be found in patent filing US20030232649A1 "Gaming system and method" herein referenced as prior art 3. Prior art 3 utilizes processors onboard robotic vehicles with a centralized controlling system. While the present disclosure uses processors, each one is specific to the vehicle in which it is installed. Additionally, in the present disclosure, the control system is not centralized as in prior art 3 and has provisions for manipulating the controls locally on the vehicles. In addition, prior art 3 doesn't have provisions to shut down the receiver during an emitter (gun firing) operation.

A similar system which uses no infra-red emitters or receivers may be found in U.S. patent application US20070243914A1 "Toy combat gaming system" herein referenced as prior art 4. Prior art 4 requires a "virtual weapon" and "positioning receiver" and system in which all vehicles in combat are in constant communication. In contrast to prior art 4, the disclosure uses infra-red emitters and receivers without continual communication between the vehicles. No positioning information is required for the present disclosure. Additionally, the disclosure uses specifically pulsing of the vehicle motor when "hit".

Additional prior art may be found in Japanese patent JP3886832B2 "Infra-red firing type tank combat system" herein referenced as prior art 5. Prior art 5 is used for tanks only whereas the present disclosure may be used for aircraft, land, or sea vehicles. While prior art 5 shuts down the controls, the present disclosure manipulates the controls while allowing the user to retain control of the vehicle in a modified state. Prior art 5 has no provisions for shutting down the detector during a firing operation to avoid hitting its own receiver. Additionally, there is no pulsation of the vehicle motor when hit or any light display.

In most cases the system transmitter and receiver are separate devices and thus multi-directional communication is not possible. However, with use in a combat system, each device must incorporate both a transmitter to "shoot" a target and a receiver to receive signals "hits" from an attacking system. In order for the system not to interfere with its own receiver, techniques such as encoding or disconnecting the receiver while firing must be incorporated.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are examples of an infra-red combat gaming system for use in radio controlled vehicles as well as methods of implementation of the system. In one aspect, which may include at least a portion of the subject matter of any of the preceding and/or following examples and aspects, a combat system incorporates both a transmitter and a receiver which are encoded such that they do not interfere with each other when the system is sending signals "firing". The system is encoded such that it may receive signals "fire" from other combat systems whilst transmitting signals "firing". Additionally, the system gives outputs to the controls of the vehicle to notify players that the vehicle is being "hit" as well as manipulate the controls of the vehicle to simulate damage from combat. Additional systems such as lights and buzzers may be incorporated into the system for enhanced user experience.

The system comprises four main parts: a transmitter, a receiver, a processing unit, and Audio/Visual (A/V) output. These systems may be incorporated into a single PCB or located among several PCBs depending on the system goals and complexity.

The transmitter (gun) is an Infra-red LED (IRED) or array of IREDs or a laser diode which is pulsed at a frequency between 32 and 44 KHz by a driver circuit. The driver circuit may be a micro controller or a solid state timer such as a 555 timer. A lens may be used to change the width of the IREDs or laser to enhance range or allow for a wider "shot".

The Infra-red receiver is an infra-red (IR) receiving device incorporating one or more frequency specific infra-red phototransistors with frequency and daylight filtering. The receiver may also incorporate a smoothing capacitor and a diode to smooth out small ac signals from the vehicle's systems.

The A/V output may be a series of LEDs and/or a buzzer. The A/V output enhances player experience by indicating to all players when a vehicle is "hit". Additionally, the LED lights may be used specifically for night-time operations to make it easier to locate a target. When "hit" the lights will dim and the buzzer will sound to allow the attacking vehicle to know that a "hit" is being registered on their target.

The processing unit processes both the infra-red signals from the combat system as well as signals from the radio controlled (RC) vehicle. The processing unit receives commands from the RC vehicle and manipulates them before sending the signal out to the vehicle controls. At the same time, the processing unit also receives inputs from the IR receiver and counts the number of "hits". As the vehicle is "hit" the processing unit manipulates the controls to simulate combat damage. Damage simulation may be pulsing of the motor rapidly, shaking of the controls, output of a buzzer, or dimming of aircraft lights to indicate to all players in the game when an aircraft is being "hit".

The processing unit encodes and synchronizes the IR transmitter (gun) and IR receiver. When activating the gun, the receiver and gun are active or shut down at different times so the system does not hit itself when shooting, but still allows the system to receive fire from other vehicles. For example, when activated, the receiver is disabled while the gun fires for a short period of time. The gun is then shut down and the receiver is active for a period of time allowing the system to receive fire. The cycle then repeats this process until the user disengages the gun or the system timer runs out and the user must "reload" their gun by disengaging their "fire" control.

As the vehicle takes "damage" through multiple "hits" the vehicle's controls may be altered to make the vehicle turn, climb, or roll simulating a damaged vehicle. After a certain number of "hits" the system enters the "destroyed" state. During the "destroyed" state, the system IR transmitter (gun) is disabled and all controls with the exception of the motor are passed through the processing unit with no manipulation. To indicate that a vehicle is "destroyed" or "shot down", a slower pulsing of the vehicle motor, system lights, or buzzer for a predetermined period of time.

The processing unit includes user adjustable settings such as damage adjust knobs and a "mode switch". These allow the players to adapt the system to their specific vehicles by changing the way the processing unit responds to damage and hits. The damage adjust knobs change the amount of control manipulation the processing unit does when receiving a hit and when entering a damage mode. The mode switch changes modes between progressive damage type combat where the controls are manipulated and a simplistic tag game where the controls are not altered.

DETAILED DESCRIPTION OF EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, multiple IR receivers may be used to cover multiple angles of a single vehicle. It should be appreciated that these implementations of the subject matter are covered within the scope of this invention.

Various embodiments are provided which describe a radio controlled infra-red (IR) combat system. Such systems may have implementations in a variety of fields, including, but not limited to video piloting, drone vehicles, RC vehicles (aircraft and ground).

With reference to FIG. 1 shown is an example schematic diagram of an infrared combat system in accordance with one or more embodiments. The microcontroller 50 shall be a 8 MHz or greater microprocessor with at least 15 available Input/output pins:

1. The microcontroller receives input 52$i$ signals, processes d and sends output signals 52$o$.
2. The microcontroller provides visual feedback via onboard status led 59, amplifier 53$b$, and audio output 50$c$.
3. The microcontroller displays score via an individually addressable ROB led strip 50$a$ through output signals 52$o$.
4. The microcontroller includes one or more potentiometers 50$b$ to adjust output signals based on desired vehicle operating characteristics.

The power regulator 51 consists of a voltage regulator 51$a$, smoothing capacitors, and an LED to indicate power Radio control input signals and IR Receiver signals are received by the Inputs pin header 52$i$. Servo/motor and IR gun output signals are transmitted by the Outputs pin header 52$o$.

The guns generator 53 consist of a pulse driver 53$a$ which is a 555 timer or equivalent oscillator and amplifier 53$b$, and an RED emitter 55.

IR Receiver 54 consists of one or more IR detectors, a diode and a capacitor.

IR Gun 55 consists of one or more IREDs. In some embodiments, a switch 55$a$ may be included to select long/short range operation. The switch 55$a$ on the IR gun 55 may bypass a power limiting resistor to increase the power supplied to the IRED(s). In some embodiments the IR Gun 55 may be a laser diode.

FTDI pin header 57 is used to load firmware onto the microcontroller 52. In various embodiments, FTDI header pin may not be installed.

The mode switch 58 allows user to select between various gameplay modes such as "Battle mode" and "Race mode" which is described in a later figure.

Damage indicator led 59 is an onboard led that provides real time visual feedback for damage received.

Damage indicator led strip 60 consists of an amplifier 60a and is an external led strip that provides real time visual feedback for damage received.

Figure 1A:
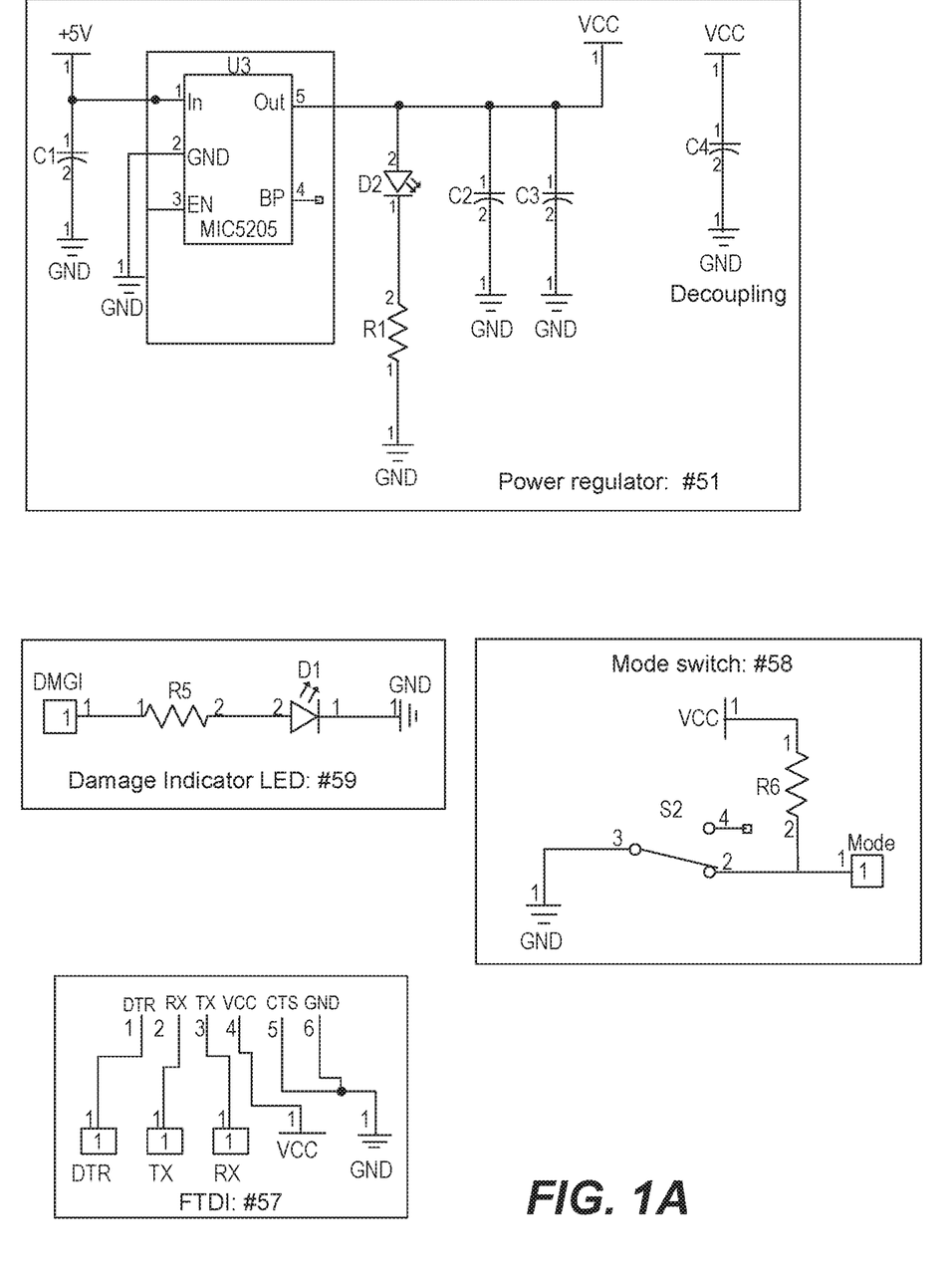
FIG. 1A is a schematic diagram in accordance with one or more embodiments.
Figure 1B:
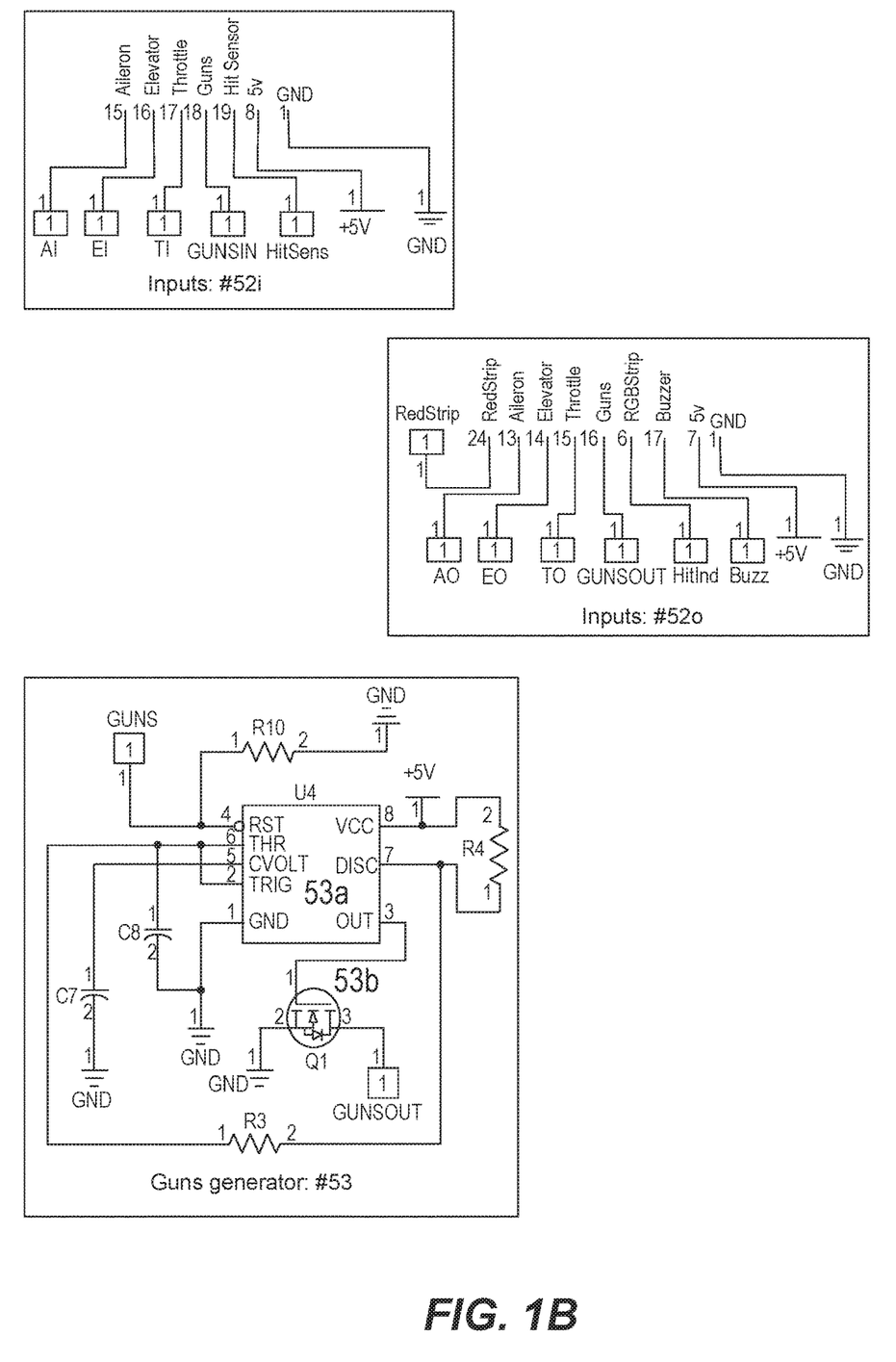
FIG. 1B is a schematic diagram in accordance with one or more embodiments.
Figure 1C:
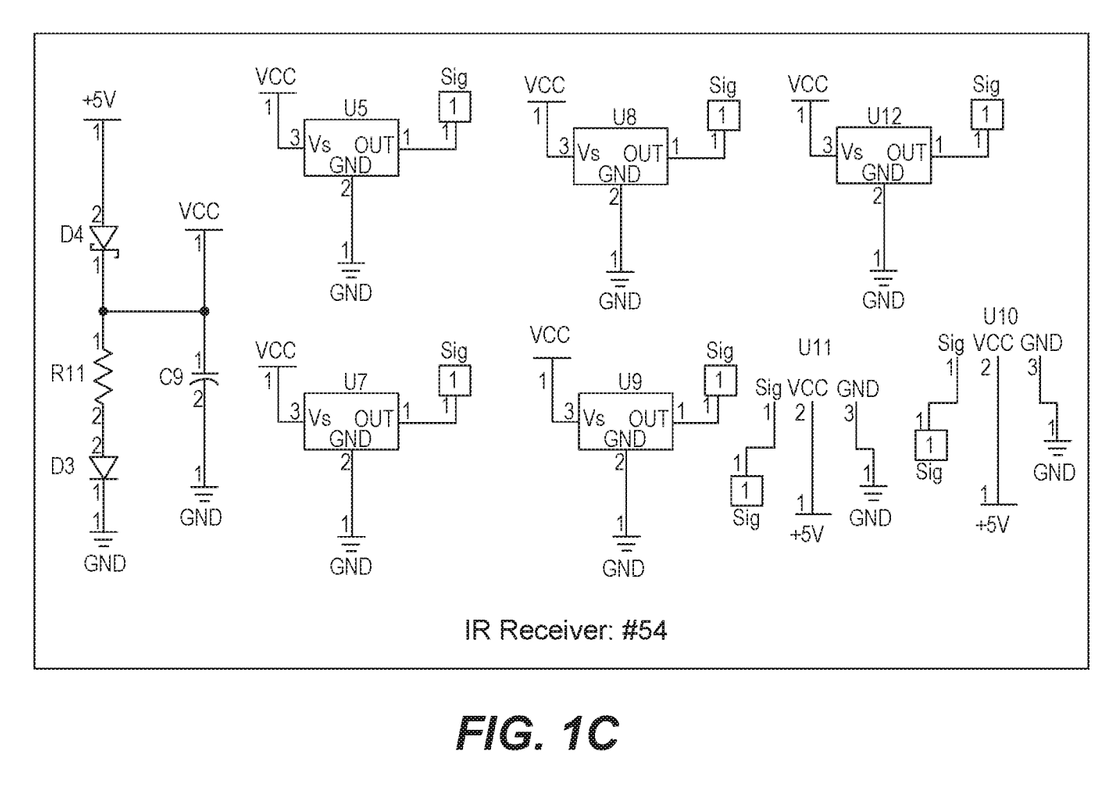
FIG. 1C is a schematic diagram in accordance with one or more embodiments.
Figure 1D:
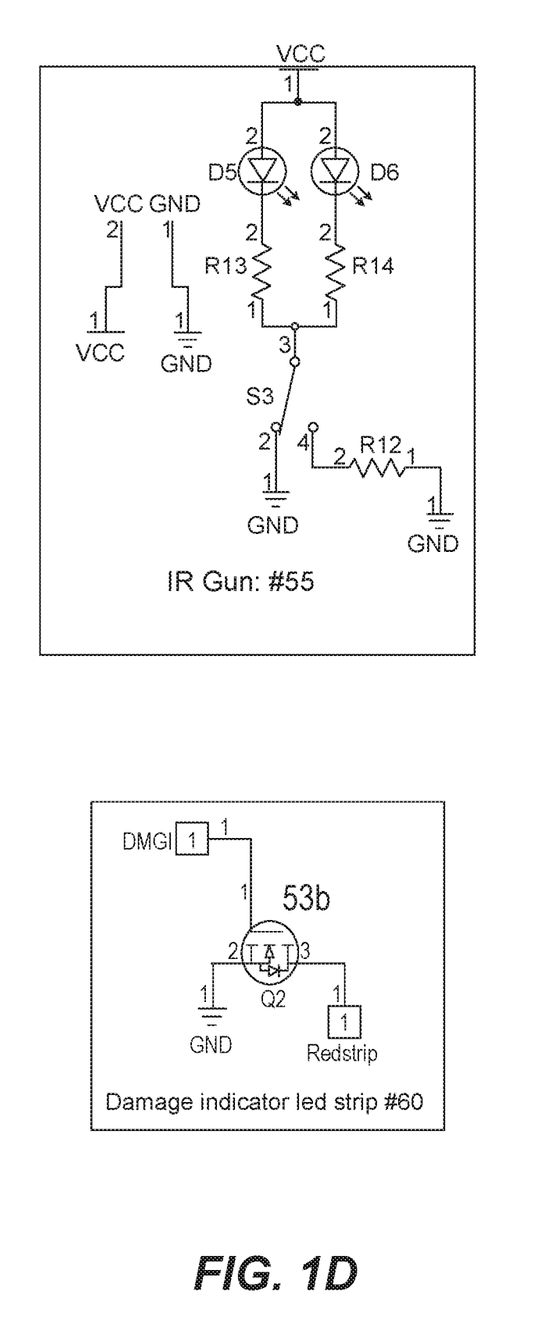
FIG. 1D is a schematic diagram in accordance with one or more embodiments.
Figure 1E:
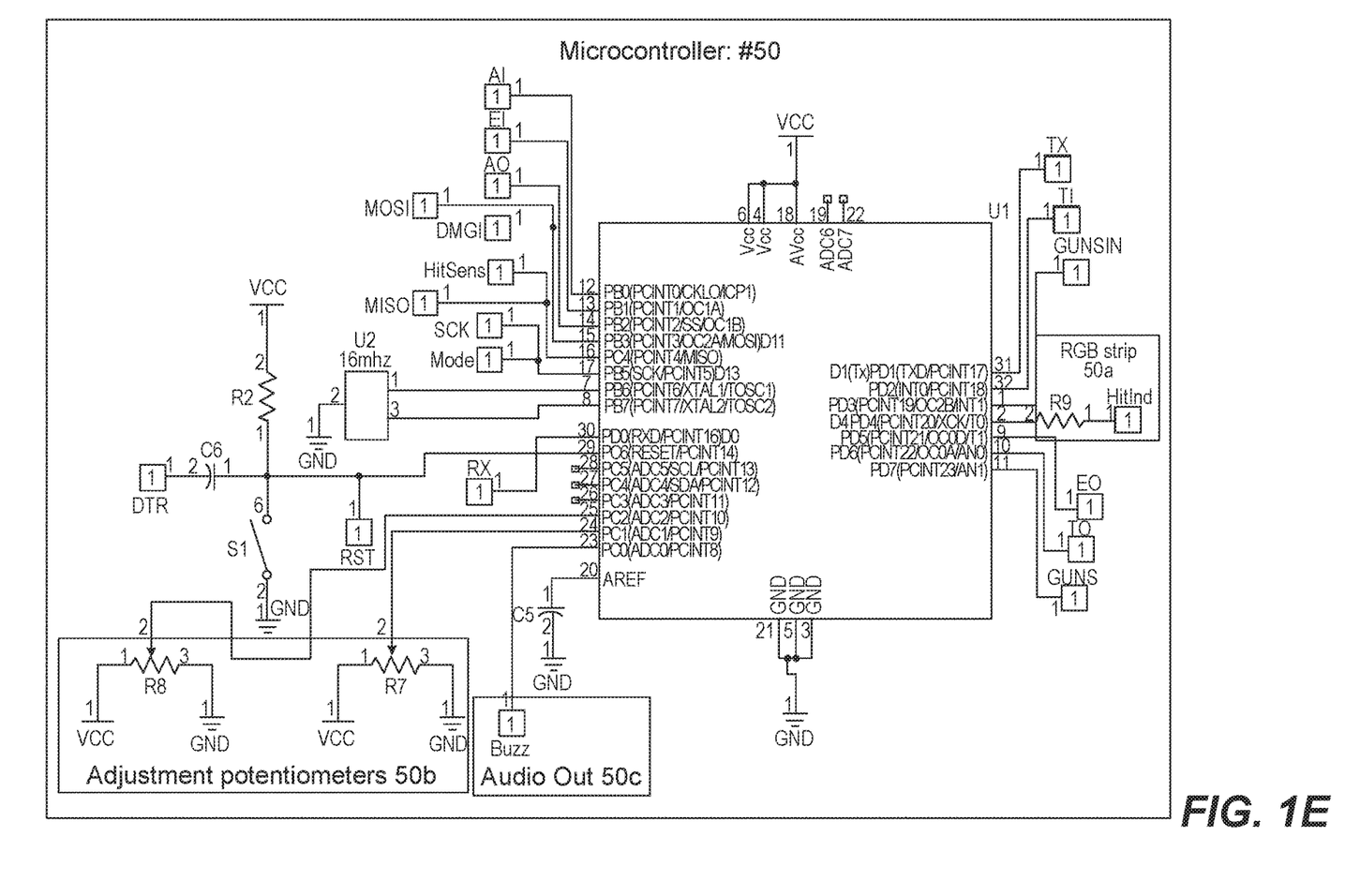
FIG. 1E is a schematic diagram in accordance with one or more embodiments.
Figure 2:
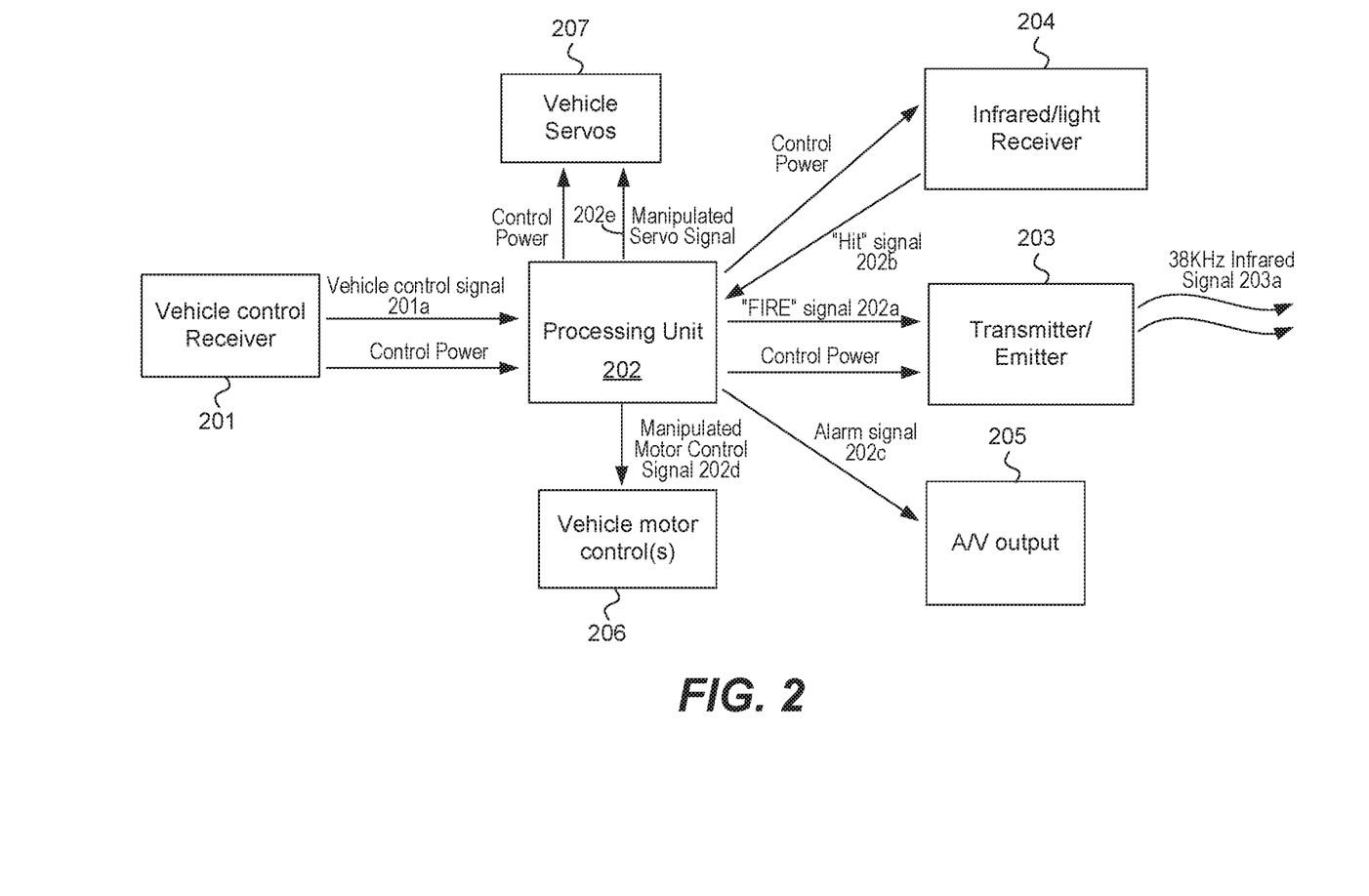
FIG. 2 is a perspective connection diagram of the combat system with a vehicle in accordance to one or more embodiments.

With reference to FIG. 2 shown is a perspective connection diagram of an infrared combat system 200 installed in a radio controlled vehicle. The processing unit 202 receives control power and control signals from the vehicle's RC control receiver 201. The processing unit 202 then manipulates these signals and sends them out to the vehicle motor controller 206 and the vehicle control servos 207.

Additionally, part of the vehicle control signal 201a may contain a "FIRE" command. When the user gives the fire command to the receiver, the processor modulates this command converts it to a fire signal 202a and relays it to the transmitter/emitter 203 intermittently. The transmitter/emitter 203 sends out a pulsed infrared signal 203a at 38 KHz via infrared emitting diodes (IREDs) each time the "FIRE" command is received.

The infrared/light receiver 204 receives power from the processing unit 202 and sends back a "HIT" signal 202b when it detects a 38 KHz pulsed infrared signal 203a. If processing unit is not sending a "FIRE" signal 203a to the emitter/transmitter then the processing unit counts a "HIT". If the processing unit is sending a "FIRE" signal 203a to the emitter/transmitter 203, then the processing unit ignores the signal from the infrared/light receiver 204.

When "HIT" signals 202b from the Infrared/light receiver 204 are received processing unit 202 will alter the manipulated motor control signals 202d to the vehicle motor controller 206 causing the motor to pulse rapidly. If the user has the "MODE Switch" in "battle mode" then the manipulated servo signal 202e to the vehicle servos 207 may be altered from the control signal 201a. If the user has the "MODE Switch" in "race mode" then the signals to the vehicle servos 207 is not altered. Additionally, alarm signals 202c are sent from the processing unit 202 to the A/V output 205 which turn off onboard vehicle lights and may sound a buzzer to indicate the vehicle is being hit.

After a predetermined number of "HIT" signals are accepted by the processing unit 202 the vehicle goes into "destroyed mode" for 4-8 seconds. In this mode the signals to the emitter/transmitter are disabled, signals to the vehicle servos 207 are unaltered, and the manipulated motor control signals 202e to the vehicle motor 206 are pulsed slowly to indicate the vehicle has entered "destroyed mode". The processing unit 202 will also send signals to the A/V output 205 which may cause a buzzer to sound or lights to flash slowly. Once the time has run out for "destroyed mode" manipulated motor control signals 202e and manipulated servo control signals 202d return to normal un-altered state as received from the vehicle receiver 201.

What is claimed is:

1. A radio controlled infrared ("IR") combat system comprising:
    an IR transmitter pulsed intermittently between 32 and 44 KHz;
    an IR receiver filtered between 32 and 44 KHz and filtered for ambient light;
    an audio/visual output system including
        an LED light display;
        an audible buzzer; and
        a processing unit for
    accepting signals from a radio control receiver;
        accepting signals from an IR receiver;
    outputting signals to vehicle controls; and
    outputting signals to an IR transmitter, thereby
        intermittently shutting down the IR receiver and IR transmitter when engaged, and
    wherein the radio controlled IR combat system has user adjustable modes and settings.

2. The system of claim 1, wherein the IR transmitter uses IR emitting diodes (IREDs).

3. The system of claim 2, wherein the IREDs are pulsed at 38 KHz.

4. The system of claim 3, wherein the IR receiver contains one or more 38 KHz filtered phototransistors.

5. The system of claim 1, wherein the processing unit accepts inputs and transmits signals related to RC control.

6. The system of claim 1, wherein the processing unit alters RC control outputs.

7. The system of claim 1, wherein the processing unit intermittently disengages the IR receiver and an IR gun such that the combat system does not hit itself.

8. An infrared ("IR") combat system comprising:
    an IR transmitter having a pulse driver including
        a 38 KHz timer, a transistor amplifier, one or more IR emitting diodes;
    an infrared (IR) receiver including:
        one or more 38 KHz filtered phototransistors
        a power filter having
        a diode; and
        a capacitor; and
    a processing unit for accepting signals from an RC receiver outputting manipulated signals to vehicle controls;
        outputting to an audio and visual display intermittently engaging the IR transmitter in which the IR receiver is disabled when operating the IR transmitter; and
    the IR transmitter is disabled intermittently and the IR receiver is enabled.

9. The processing unit of claim 8, wherein the number of hits is counted.

10. The processing unit of claim 9, wherein the control outputs are manipulated according to the number of hits.

11. A method of combat gameplay comprising:
    a vehicle containing an IR transmitter, IR receiver and a processing unit for
    accepting signals from a radio control receiver;
    accepting signals from the IR receiver;
    outputting signals to vehicle controls; and
    outputting signals to the IR transmitter, wherein a radio controlled IR combat system which, when damaged, may alter controls of the vehicle visually or audibly indicating when the vehicle is hit or damaged.

12. The method of claim 11, wherein the radio controlled IR combat system is adjustable for different vehicles.

13. The method of claim 11, wherein the vehicle is an RC aircraft, RC land vehicle, or drone.

14. The method of claim 11, wherein the controls are altered when the vehicle is hit.

15. The method of claim 11, wherein a vehicle motor output is temporarily pulsed or shut down after being hit for a user adjustable number of times.

16. The method of claim 11, wherein the processing unit keeps count of a number of times the vehicle has been hit.

17. The method of claim 11, wherein a pre-determined number of hits cause the radio controlled IR combat system to enter a destroyed state.

18. The method of claim 17, wherein the radio controlled IR combat system disables the IR transmitter and returns controls without manipulation when the vehicle is in the destroyed state.

19. The method of claim 17 wherein the radio controlled IR combat system automatically resets after a pre-determined amount of time after being in the destroyed state.

\* \* \* \* \*